United States Patent [19]

Hergenrother et al.

[11] Patent Number: 5,010,197

[45] Date of Patent: Apr. 23, 1991

[54] POLYPHENYLQUINOXALINES VIA AROMATIC NUCLEOPHILIC DISPLACEMENT

[75] Inventors: Paul M. Hergenrother, Yorktown; John W. Connell, Newport News, both of Va.

[73] Assignee: The United States of America as represented by the Administrator of the National Aeronautics and Space Administration, Washington, D.C.

[21] Appl. No.: 454,820

[22] Filed: Dec. 22, 1989

Related U.S. Application Data

[63] Division of Ser. No. 250,661, Sep. 28, 1988, abandoned.

[51] Int. Cl.$^5$ .................. C08G 8/02; C07D 241/36
[52] U.S. Cl. .................... 544/353; 528/125; 528/126; 528/171; 528/172; 528/185
[58] Field of Search ............... 544/353; 528/125, 126, 528/171, 172, 185

[56] References Cited

U.S. PATENT DOCUMENTS

| | | | |
|---|---|---|---|
| 3,852,244 | 12/1974 | Heath et al. | 528/125 |
| 3,966,729 | 6/1976 | Kovar et al. | 528/125 |
| 4,739,058 | 4/1988 | Fekhardt et al. | 544/353 |

*Primary Examiner*—John Kight, III
*Assistant Examiner*—T. Mosley
*Attorney, Agent, or Firm*—George F. Helfrich; Harold W. Adams; John R. Manning

[57] ABSTRACT

Polyphenylquinoxalines are prepared by the nucleophilic displacement reaction of di(hydroxyphenyl)quinoxaline monomers with activated aromatic dihalides or dinitro compounds. The reactions are carried out in polar aprotic solvents during alkali metal bases at elevated temperatures under nitrogen. The di(hydroxyphenyl)quinoxaline monomers are prepared either by reacting stoichiometric quantities of aromatic bis(o-diamines) with a hydroxybenzil or by reacting o-phenylenediamine with a dihydroxybenzil or bis(hydroxyphenylglyoxylyl)benzene.

3 Claims, No Drawings

POLYPHENYLQUINOXALINES VIA AROMATIC NUCLEOPHILIC DISPLACEMENT

This is a division of application Ser. No. 07/250,661, filed Sept. 28, 1988 now abandoned.

ORIGIN OF INVENTION

The invention described herein was made by employees of the U.S. Government and may be manufactured and used by or for the Government for governmental purposes without payment of any royalties thereon or therefor.

BACKGROUND OF INVENTION

Polyphenylquinoxalines are high temperature thermo-plastics which exhibit excellent performance as adhesives, coatings, films and composite matrices. These materials are heterocyclic polymers synthesized by the condensation reaction of a bis(phenyl-α-diketone) with an aromatic bis(o-diamine).

Schematically, this may be represented in Equation I:

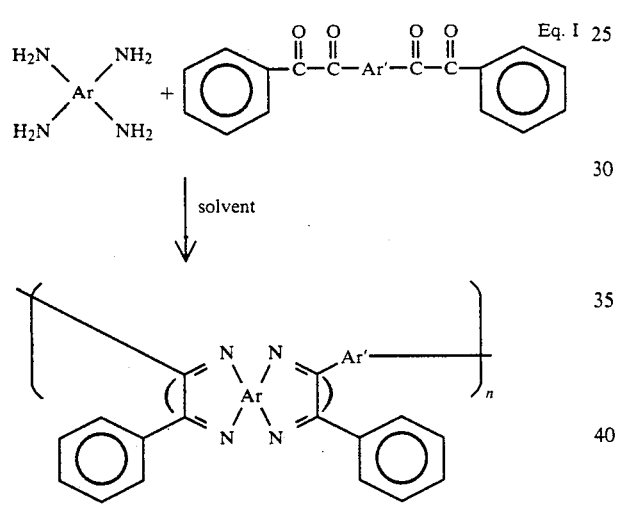

Polyphenylquinoxalines prepared from such condensations are configurationally unordered with three possible isomers distributed randomly along the polymer chain; see Hergenrother, *Encyclopedia of Polymer Science Technology*, Vol. 13, p. 55, (1988).

As a direct result of the use of the condensation reaction to synthesize polyphenylquinoxalines, there are several limitations.

First, because the polyphenylquinoxalines are not configurationally ordered, their mechanical properties (as evidenced for example by tensile modulus) and strength are limited, and the resultant lack of crystallinity renders them subject to attack by chlorinated organic solvents.

Second, the bis(phenyl-α-diketones) required for polyphenylquinoxaline formation are relatively difficult to prepare and expensive.

Third, the structure of polyphenylquinoxaline is difficult to vary.

Thus, it is an object of this invention to prepare configurationally ordered polyphenylquinoxalines, in order to improve strength and resistance to attack by organic solvents.

It is a further object to devise a means of preparing polyphenylquinoxaline, either configurationally ordered or not, by a means other than the bis(phenyl-α-diketone)/bis(o-diamine) condensation, so that the use of expensive bis(phenyl-α-diketones) may be avoided and so that the polyphenylquinoxaline structure can be more readily and conveniently varied.

SUMMARY OF INVENTION

The objects of this invention are obtained by (1) forming di(hydroxyphenyl)quinoxaline monomers (a) by the condensation of 2 moles of a hydroxybenzil with an aromatic bis(o-diamine) as represented in Equation II:

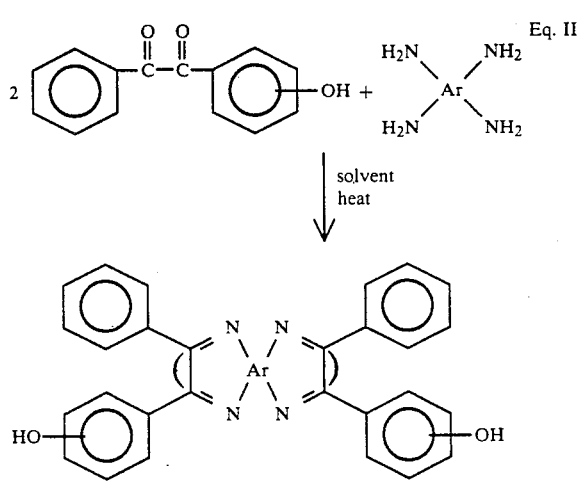

where Ar is 1,2,4,5-tetrasubstituted benzene, 3,3',- 4,4'-tetrasubstituted; biphenyl, diphenylether, diphenylmethane, diphenylketone, diphenylsulfone, diphenylthioether or any appropriate bis(o-diamine) and mixtures thereof. The catenation of the hydroxy group may be meta-meta, para-para, or para-meta.

Alternatively, the di(hydroxyphenyl) quinoxaline monomers are formed (b) by the condensation of a dihydroxybenzil with an aromatic o-diamine, which may be a substituted o-diamine, as represented in Equation III:

where Z=H, Cl, Br, OCH$_3$, CH$_3$, CH$_2$CH$_3$, or Ph. The catenation of the hydroxy group may be meta-meta, para-para, or para-meta.

More complex dihydroxybenzils may be used, producing correspondingly more complex phenylquinoxaline monomers, as represented in Equation IV:

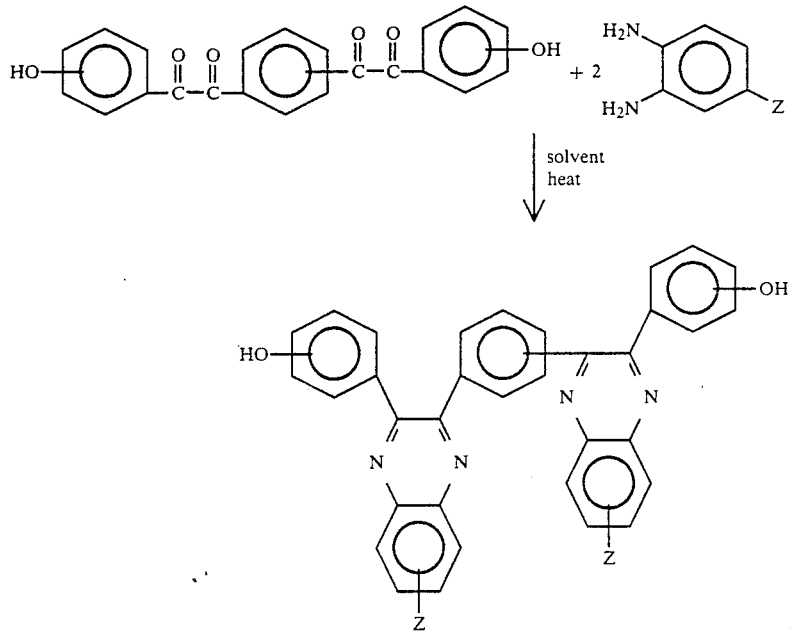

Eq. IV

In the case where Z is H, there are no configurational isomers.

(2) Polyphenylquinoxalines are produced by the aromatic nucleophilic displacement reaction of a phenyl quinoxaline monomer (described above) with an activated aromatic compound of the following structure:

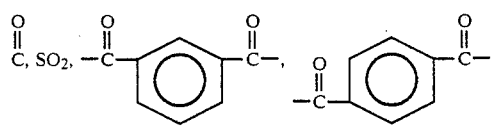

where X is selected from the group in Equations V and VI:

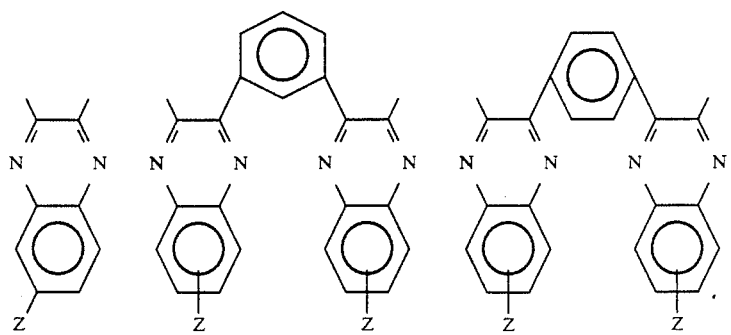

and where Y is F, Cl, or NO$_2$.

The polyphenylquinoxaline synthesis and product structure may be represented below, in its two main variants:

Eq. V

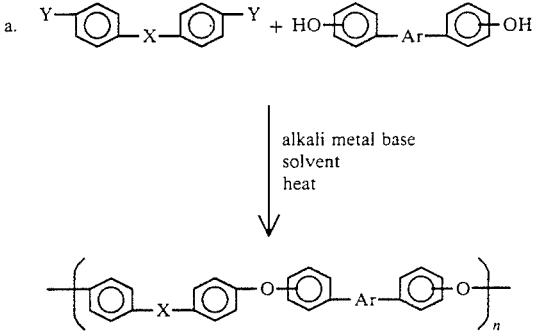

where
Ar is:

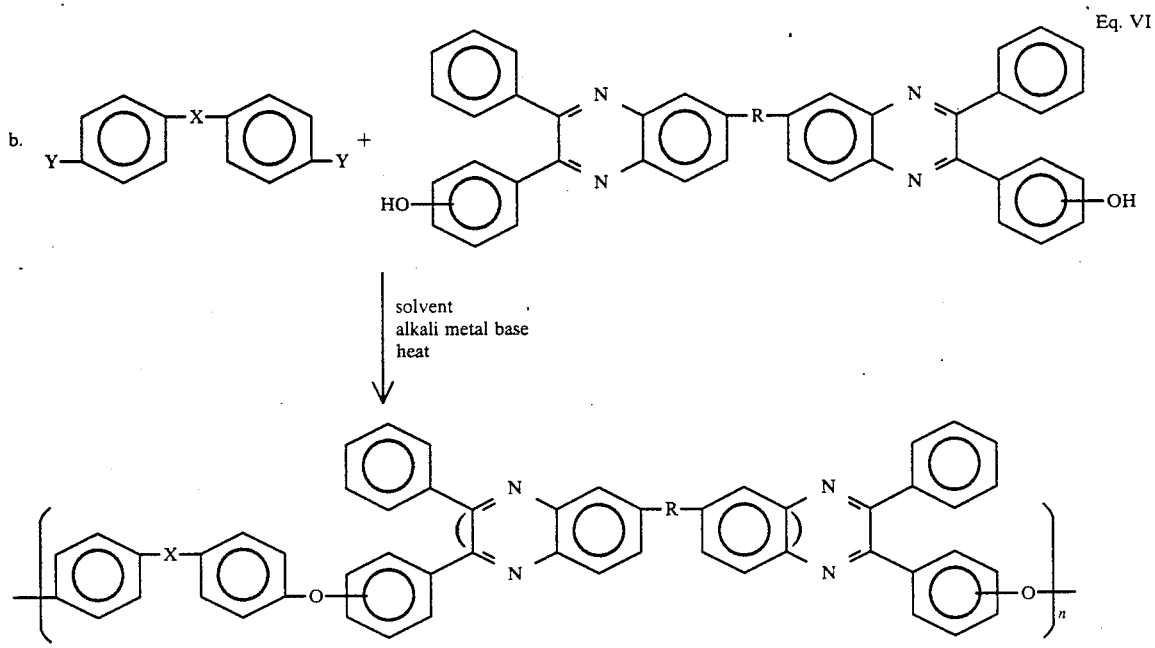

where:
Y is F, Cl, or $NO_2$,
R is nil, $SO_2$, CO, O, S, $C(CH_3)_2$, $C(CF_3)_2$, or $CH_2$
and
X is: C=O, $SO_2$,

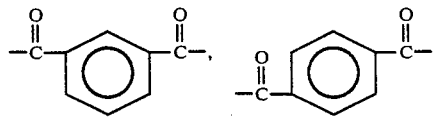

Where the di(hydroxyphenyl)quinoxaline monomers have structural isomers, the resultant polyphenyl-quinoxaline is not configurationally ordered, but the polyphenyl-quinoxalines are new and have excellent properties.

Where the di (hydroxyphenyl)quinoxaline monomers have no structural isomers, the resultant polyphenyl-quinoxaline is configurationally ordered; certain of these polyphenyl-quinoxalines are semi-crystalline.

The configurationally ordered polyphenylquinoxalines are insoluble in polar aprotic solvents such as N,N-dimethylacetamide, N-methylpyrrolidone, and dimethylsulfoxide, and are insoluble in chlorinated hydrocarbons such as methylene chloride, chloroform and tetrachloroethane. Thin films of representative configurationally ordered polyphenylquinoxalines were immersed in hydraulic fluid for 24 hours and chloroform for one hour, after which no noticeable swelling or crazing was observed.

DETAILED DESCRIPTION OF INVENTION

Having generally described the invention, a more complete understanding thereof can be obtained by reference to the following specific examples which are provided herein for purposes of illustration only and do not limit the invention.

EXAMPLES

Example 1

The following Example illustrates the reaction sequence for the synthesis of the polyphenylquinoxaline where Y=F, R=nil and X is:

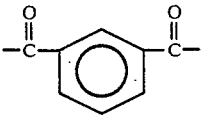

See Equation VI.

Monomer Synthesis 6,6'-bis[2-(4-hydroxyphenyl)-3-phenylquinoxaline] and isomers: Into a 250 ml round bottom flask equipped with a magnetic stirrer and reflux condenser was placed 4-hydroxybenzil (6.23 g, 0.0274 mol), 3,3'-diaminobenzidine (2.94 g, 0.0137 mol), absolute ethanol (30 ml) and benzene (30 ml). The mixture was stirred at room temperature for one hour, then refluxed overnight. The solution was cooled and the yellow solid was filtered, washed with water and dried at 100° C. for three hours. Yield 7.94 g (98%), m.p. >360° C. Anal. Calcd. for $C_{40}H_{26}N_4O_2$: C, 80.79%; H, 4.41%; N, 9.42%. Found: C, 80.56%; H, 4.22%; N, 9.48%.

Polyphenylquinoxaline Synthesis

Into a 250 ml three neck round bottom flask equipped with a mechanical stirrer, thermometer, nitrogen inlet, moisture trap, and reflux condenser was placed 1,3-bis(4-fluorobenzoyl)benzene (1.9339 g, 0.006 mol), 6,6'-bis[2-(4-hydroxyphenyl)-3-phenylquinoxaline] and isomers (3.5678 g, 0.006 mol) powdered anhydrous potassium carbonate (1.90 g, 0.0138 mol), N,N-dimethylacetamide (40 ml) and toluene (25 ml). The mixture was heated to 135° C. for three to four hours to remove water, toluene was removed from the system and the temperature was increased to 155° C. overnight. The polymer was isolated by precipitation into water/acetic acid mixture, washed successively with water and methanol and dried. Yield 5.1 g (97%) of off-white polymer with an inherent viscosity of 1.09 dL/g and a glass transition temperature of 240° C. Thin films cast from m-cresol solution gave tensile strength, tensile modulus and elongation at 25° C. of 11,500 psi, 353,000 psi and 7.7% and at 177° C. of 6550 psi, 250,000 psi and 65 percent respectively.

Example 2

The following Example illustrates the reaction sequence for the synthesis of a semi-crystalline polyphenylquinoxaline where Y is F, X is

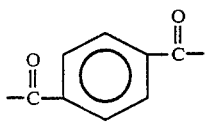

and Ar is

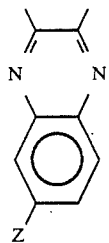

and Z is H. See Equation V.

Monomer Synthesis 2,3-bis(4-hydroxyphenyl)quinoxaline: Into a 250 ml round bottom flask equipped with a magnetic stirrer and reflux condenser was placed 1,2-diaminobenzene (2.3275 g, 0.0215 mol), 4,4'-dihydroxybenzil (5.2135 g, 0.0215 mol) and absolute ethanol (30 ml). The solution was stirred for one-half hour at room temperature, and a yellow precipitate formed. The mixture was heated to reflux overnight. The solvent was removed by vacuum distillation and the solid dried at 100° C. for two hours to give 6.6 g (97%) of yellow powder. The material was recrystallized from 1,4-dioxane/water mixture. Yield 6.0 g (89%) m.p. 336° C.–338° C. Anal. Calcd for $C_{20}H_{14}N_2O_2$: C, 76.42%; H, 4.49%; N, 8.91%. Found: C, 76.54%; H, 4.44%; N, 8.96%.

Polyphenylquinoxaline Synthesis

Into a 100 ml three neck round bottom flask equipped with a mechanical stirrer, thermometer, nitrogen inlet, moisture trap and reflux condenser was placed 1,4-bis(4-fluorobenzoyl)benzene (1.4604 g, 0.0045 mol), 2,3-bis(4-hydroxyphenyl)quinoxaline (1.4243 g, 0.0045 mol), powdered anhydrous potassium carbonate (1.45 g, 0.0104 mol), N,N-dimethylacetamide (19 ml) and toluene (20 ml). The mixture was heated to 135° C. for three hours to remove water, then increased to 155° C. overnight. The polymer had precipitated from solution overnight during the synthesis. The mixture was poured into acetic acid/water to give a white powder which was subsequently washed with water and then methanol and dried at 100° C. Yield 2.6 g (97%) of white polymer with a glass transition temperature of 208° C. and a crystalline melt temperature of 365° C. The inherent viscosity of a 0.5 percent solution in m-cresol measured at 25° C. was 0.83 dL/g. A thin film cast from m-cresol was determined to be semi-crystalline by wide angle X-ray diffraction.

Example 3

The following Example illustrates the reaction sequence for the synthesis of a semi-crystalline polyphenylquinoxaline where Y is F, X is $SO_2$ and Ar is

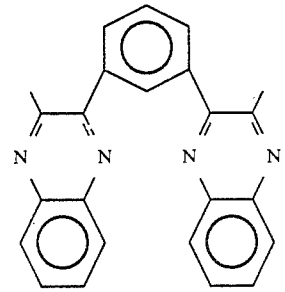

See Equation V.

Monomer Synthesis 1,3-bis[2-quinoxalyl-3-(4-hydroxy-phenyl)]benzene. Into a 250 ml round bottom flask equipped with a magnetic stirrer and reflux condenser was placed 1,3-bis(4-hydroxyphenylglyoxylyl)benzene (5.1412 g, 0.0137 mol), 1,2-diaminobenzene (2.9705 g, 0.0274 mol) and absolute ethanol (45 ml). The solids dissolved rapidly to give an orange solution, and after 15 minutes a yellow precipitate formed. The mixture was diluted with absolute ethanol (125 ml) and refluxed overnight. The mixture was poured into water, collected and dried to give 7.0 g (98%) of yellow solid. The solid was recrystallized from ethanol/water (5:1) mixture to give yellow needles, m.p. 339° C.–343° C.

Polyphenylquinoxaline Synthesis

Into a 100 ml three neck round bottom flask equipped with a mechanical stirrer, thermometer, nitrogen inlet, moisture trap and reflux condenser was placed 4,4'-difluorodiphenyl sulfone (1.2712 g, 0.005 mol), 1,3-bis[2-quinoxalyl-3-(4-hydroxyphenyl)] benzene (2.5927 g, 0.005 mol), powdered anhydrous potassium carbonate (1.6 g, 0.0115 mol), N,N-dimethylacetamide (20 ml) and toluene (35 ml). The mixture was heated to 135° C. for three to four hours to remove water, then increased to 155° C. overnight. The polymer had precipitated from solution overnight during the synthesis. The mixture was poured into acetic acid/water to give an off-white powder which was subsequently washed with water and then methanol and dried at 100° C. Yield 3.55 g (99%) of polymer with a glass transition temperature of 235° C. and a crystalline melt temperature of 388° C. The inherent viscosity of a 0.5 percent solution in m-cresol measured at 25° C. was 0.24 dL/g.

Polymer characterization is presented in Tables 1 and 2 below.

TABLE 1
POLYMER CHARACTERIZATION

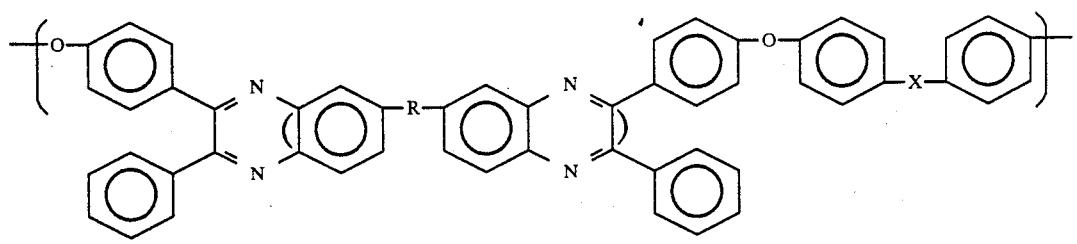

| R | X | $\eta_{inh}$, dL/g* | Tg, °C** |
|---|---|---|---|
| nil | SO$_2$ | 0.90 | 283 |
| nil | CO | 0.80 | 252 |
| nil | isophthaloyl | 1.09 | 240 |
| CO | SO$_2$ | 0.69 | 268 |
| CO | CO | 1.30 | 253 |
| CO | terephthaloyl | 1.01 | 255 |
| CO | isophthaloyl | 0.61 | 235 |
| O | SO$_2$ | 0.34 | 240 |
| O | terephthaloyl | 0.45 | 226 |
| O | isophthaloyl | 0.46 | 213 |

*Inherent viscosities in m-cresol at 0.5% concentration (w/v) at 25° C.
**Determined by differential scanning calorimetry at 20° C./min.

TABLE 2
POLYMER CHARACTERIZATION

| X | $\eta_{inh}$ dL/g* | Tg, °C** |
|---|---|---|

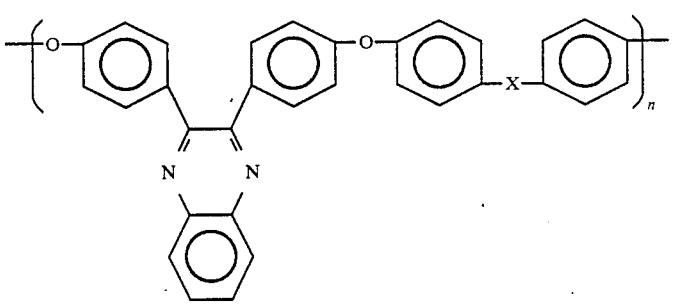

| X | $\eta_{inh}$ dL/g* | Tg, °C** |
|---|---|---|
| SO$_2$ | 0.54 | 240 |
| CO | 0.58 | 209 |
| 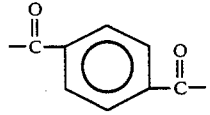 | 0.83 | 208 (Tm = 365) |

| | 0.50 | 179 |

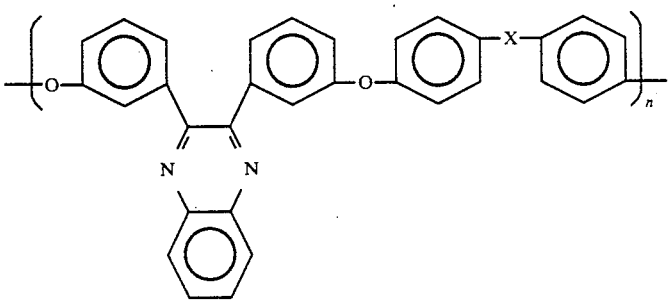

| | | |
|---|---|---|
| CO | 0.52 | 179 (Tm = 377) |

TABLE 2-continued

POLYMER CHARACTERIZATION

| X | $\eta_{inh}$ dL/g* | Tg, °C.** |
|---|---|---|
| SO$_2$ | 0.24 | 235 (Tm = 388) |

*Inherent viscosities in m-cresol at 0.5% concentration (w/v) at 25° C.
**Determined by differential scanning calorimetry at 20° C./min.

What is claimed as new and desired to be secured by Letters Patent of the U.S. is:

1. A di(hydroxyphenyl)quinoxaline having the general structure:

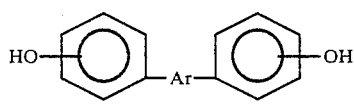

wherein
Ar is a radical selected from the group consisting of:

(A)
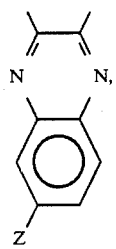

(B)
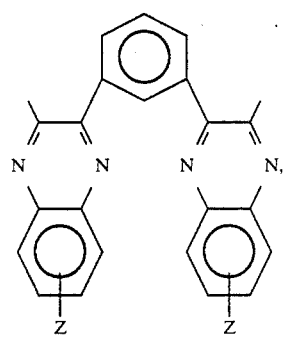

(C)
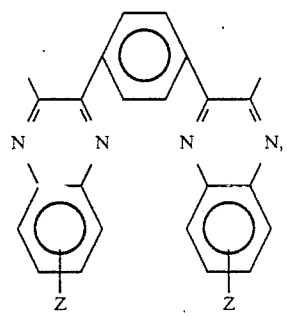

wherein
Z is a substituent selected from the group consisting of: H, F, Cl, Br, CH$_3$, CH$_2$CH$_3$, OCH$_3$, C$_6$H$_5$, and C$_6$H$_5$O.

2. The quinoxaline of claim 1 wherein Ar is:

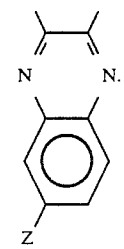

3. The quinoxaline of claim 2 where Z is H.

* * * * *